United States Patent
Clark

(10) Patent No.: US 8,671,748 B2
(45) Date of Patent: Mar. 18, 2014

(54) PRESSURE SENSOR WITH INTERNAL BELLOWS

(75) Inventor: Kenneth K. Clark, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 514 days.

(21) Appl. No.: 12/985,688

(22) Filed: Jan. 6, 2011

(65) Prior Publication Data
US 2012/0174663 A1    Jul. 12, 2012

(51) Int. Cl.
*E21B 47/06* (2012.01)
*G01L 7/06* (2006.01)

(52) U.S. Cl.
USPC ........................................ 73/152.51; 73/729.1

(58) Field of Classification Search
USPC ............... 73/152.51–152.53, 299, 715, 729.1
See application file for complete search history.

(56) References Cited

U.S. PATENT DOCUMENTS

| | | | |
|---|---|---|---|
| 3,252,325 A * | 5/1966 | Miller | 73/702 |
| 3,355,949 A * | 12/1967 | Elwood et al. | 374/117 |
| 3,834,239 A * | 9/1974 | King | 73/701 |
| 4,455,875 A * | 6/1984 | Guimard et al. | 73/708 |
| 4,938,068 A * | 7/1990 | Clements | 73/704 |
| 5,024,098 A * | 6/1991 | Petitjean et al. | 73/729.2 |
| 5,231,880 A * | 8/1993 | Ward et al. | 73/702 |
| 6,279,405 B1 | 8/2001 | Clark et al. | |
| 2007/0056378 A1* | 3/2007 | Ishii | 73/729.1 |

OTHER PUBLICATIONS

"Operating Manual for Quartzdyne Frequency Output Pressure Transducers"; Quartzdyne, Inc.; p. 1-22; Nov. 2009.

* cited by examiner

*Primary Examiner* — John Fitzgerald
(74) *Attorney, Agent, or Firm* — Cantor Colburn LLP

(57) ABSTRACT

A pressure sensor includes an outer body defining a sensor cavity and a resonator element located at least partially within the sensor cavity. The pressure sensor also includes a bellows having an outer side and an inner side and that is located at least partially within the outer body. the inner side of the bellows defines an internal volume and is configured to receive a measured fluid into the internal volume. The pressure sensor also includes a measuring fluid filling at least a portion of an area between the outer side and the outer body.

11 Claims, 1 Drawing Sheet

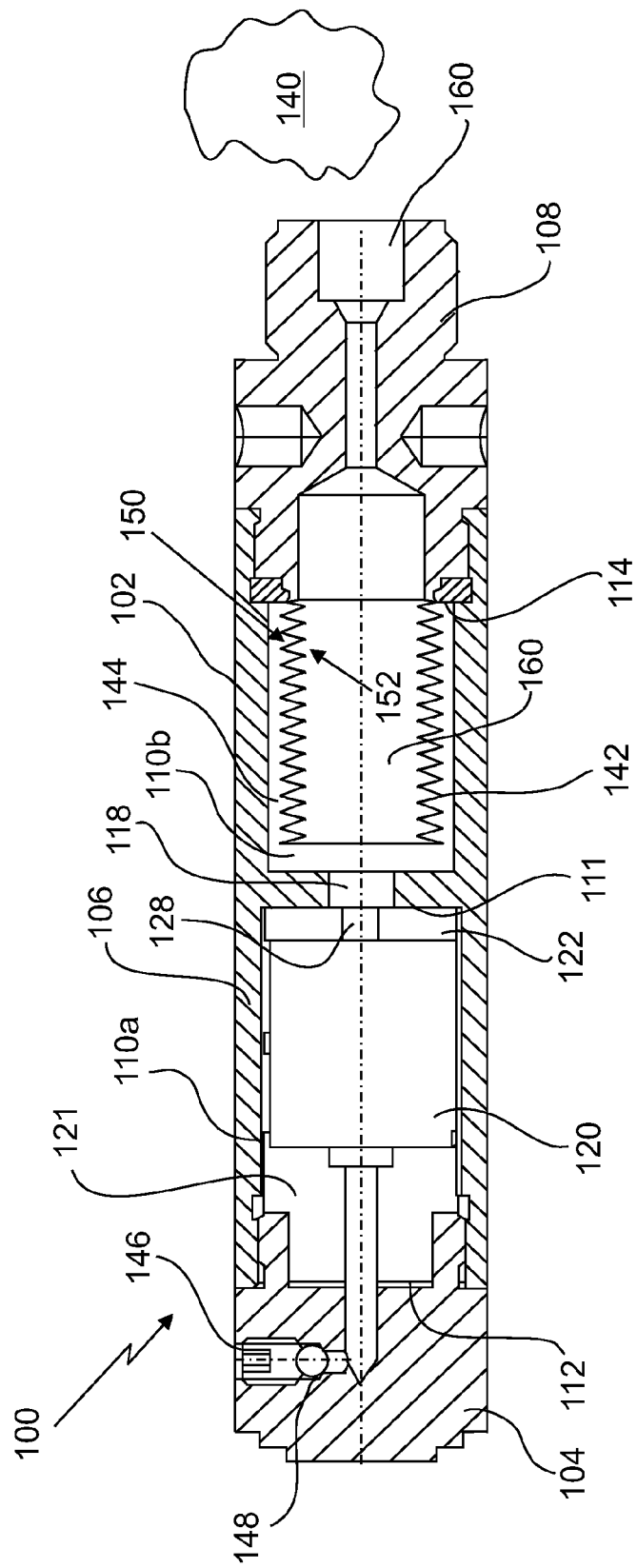

PRESSURE SENSOR WITH INTERNAL BELLOWS

BACKGROUND

In exploration and production of hydrocarbons, it is often necessary to drill a borehole into the earth to gain access to the hydrocarbons. Equipment and structures, such as borehole casings for example, are generally disposed into a borehole as part of the exploration and production. Unfortunately, the environment presented deep into the borehole can place extreme demands upon the equipment and structures disposed therein. For example, the equipment and structures can be exposed to high temperatures and pressures that can affect their operation and longevity.

An example of a piece of equipment disposed in the borehole is a pressure sensor. One type of pressure includes a resonator such as a crystal (e.g. quartz) resonator. In such sensors, variations in pressure cause the resonant frequency of the resonator to change. These changes can be measured and, thus, the pressure determined. The pressure sensor is lowered into the borehole and can be used to the measure the pressure of fluid in the borehole. Such a fluid shall be referred to as the "measured fluid" herein.

One type of pressure sensor includes a sensor cavity defined within it and which encloses the resonator. The sensor cavity includes a measuring fluid, such as an inert fluid, in contact with the resonator. In some cases, an end of the sensor cavity is defined by a bellows. During normal operation, the bellows flexes and expands or contracts in response to changes in the pressure of the measured fluid. The flexing and expanding of the bellows causes a measuring fluid contained within the bellows to, likewise, expand or contract. In these sensors the bellows includes in internal volume where the measuring fluid is located and the exterior of the bellows is exposed to the measured liquid.

SUMMARY

Disclosed is a pressure sensor that includes an outer body defining a sensor cavity and a resonator element located at least partially within the sensor cavity. The pressure sensor also includes a bellows having an outer side and an inner side and that is located at least partially within the outer body. The inner side of the bellows defines an internal volume and is configured to receive a measured fluid into the internal volume. The pressure sensor also includes a measuring fluid filling at least a portion of an area between the outer side and the outer body.

BRIEF DESCRIPTION OF THE DRAWINGS

Referring now to the drawings wherein like elements are numbered alike in the several Figures:

FIG. 1 is a cut-away side view of a pressure sensor according to one embodiment.

DETAILED DESCRIPTION

FIG. 1 is a cut-away side view of an embodiment of a pressure sensor 100 according to an embodiment of the present invention. The pressure sensor 100 includes an outer body 102. As illustrated, the outer body 102 is formed of first end portion 104, middle body portion 106 and second end portion 108. The portions 104, 106, 108 can be formed of any material that can withstand the temperatures and pressures that exist in the desired measurement location. It shall be understood that the outer body 102 could be formed of a single piece in one embodiment.

In one embodiment, the outer body 102 includes a sensor cavity 110 formed therein. In FIG. 1, the sensor cavity 110 is referenced by reference numerals 110a and 110b which are collectively referred to herein as sensor cavity 110. As illustrated, the sensor cavity 110 is located entirely within the middle body portion 106 and has a first end 112 defined by the first end portion 104 and a second end 114 defined by the second end portion 108. Of course, in one embodiment, the sensor cavity 110 can include portions that extend beyond one or more of the ends 112, 114 of the middle body portion 106.

In more detail, the sensor cavity 110 illustrated in FIG. 1 includes a resonator cavity 110a and a bellows cavity 110b. The resonator cavity 110a and the bellows cavity 110b are illustrated as being separated by a separator wall 111. Of course, the separator wall 111 could be omitted in one embodiment.

In one embodiment, a throat 118 is formed in the separator wall 111 between the resonator cavity 110a and the bellows cavity 110a. The throat 118 may allow a measuring fluid to pass between the resonator cavity 110a and the bellows cavity 110b in one embodiment and as described in greater detail below.

In the illustrated embodiment, the resonator cavity 110a includes a resonator element 120. The resonator element 120 is a crystal resonator in one embodiment and can be formed, for example, of quartz or other crystal structures. One of ordinary skill in the art will realize how to couple the required electrical circuitry to the resonator element 120 to cause it to measure pressure and, as such, that circuitry is not discussed further herein.

The resonator cavity 110a may optionally include a first spacer element 121 that fills the portion of the resonator cavity 110a not filled by the resonator element 120. In addition, the resonator cavity 110b may optionally include a second spacer element 122 disposed between the separator wall 111 and the resonator element 120. In one embodiment, the second spacer element 122 includes an inner passage 128 that allows measuring fluid passing through the throat 118 to contact and apply pressure on the resonator element 120. The variation in pressure, as described above, causes the resonant frequency of a circuit that includes resonator element 120 to vary. These variations can be utilized to determine the pressure of a measured fluid 140 located external to the sensor 100.

The bellows cavity 110b includes a bellows 142 disposed at least partially, and in one embodiment, fully, within it. In one embodiment, a measuring fluid area 144 exists between the bellows 142 and the walls of the bellows cavity 110b. In operation, the measuring fluid area 144 is filled with a measuring fluid. The measuring fluid is an inert fluid in one embodiment and can be provided to the sensor cavity 110 in general, and the measuring fluid area 144 in particular, via inlet 146. In one embodiment, the inlet 146 is sealed with a sealer ball 148 after the measuring fluid is provided to the sensor cavity 110. In another embodiment, the sealer ball 148 could be replaced by a welded plug or other sealing mechanism.

After the sealer ball 148 (or other sealing mechanisms) seals the inlet 146, the sensor cavity 110 forms a sealed volume having the elements described above and the measuring fluid enclosed therein. In such a case, the measuring fluid 144 contacts an external side 150 of the bellows 142.

The second end portion 108 includes, in one embodiment, a measured fluid channel 160 that allows the measured fluid 140 to pass to an internal volume 160 defined by an internal side of 152 of the bellows 142. Changes in the pressure of the measured fluid 140 change the pressure in the internal volume 160. The change in the pressure in the internal volume 160 causes the bellows 142 to expand or contract. The expansion and contraction of the bellows 142 causes the measuring fluid in the measuring fluid area 144 to change in volume and, as such, vary the pressure exerted on the resonator element 120.

The embodiment illustrate in FIG. 1 can include less measuring fluid than the prior art. In particular, in the prior art, the orientation of the bellows was reversed and the internal volume thereof was filled with the measuring fluid. In the present invention, the measuring fluid exists outside of the bellows 142 and, by sizing the outer body 102 appropriately, the measuring fluid area 144 can have a volume that is less than the prior art and, in particular, less than the internal volume 160. In one embodiment, reducing the amount of measuring fluid in the sensor 100 can make the sensor 100 less susceptible to errors in pressure readings due to thermal effects on the measuring fluid.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A pressure sensor comprising:
   an outer body defining at least a portion of a sensor cavity, the sensor cavity including a resonator cavity, a bellows cavity, and a separator wall disposed within the sensor cavity and separating the resonator cavity from the bellows cavity, the separator wall including a throat that allows for the measuring fluid to pass between the resonator cavity and the bellows cavity;
   a resonator element located at least partially within the sensor cavity;
   a bellows having an outer side and an inner side, the bellows located at least partially within the outer body, wherein the inner side of the bellows defines an internal volume and is configured to receive a measured fluid into the internal volume; and
   a measuring fluid filling at least a portion of an area between the outer side and the outer body.

2. The pressure sensor of claim 1, wherein the resonator element is formed of quartz.

3. The pressure sensor of claim 1, wherein the outer body includes a first end portion, a middle body portion and a second end portion.

4. The pressure sensor of claim 3, wherein the first end portion and the separator wall define opposite ends of the resonator cavity and wherein the resonator element is located within the resonator cavity.

5. The pressure sensor of claim 4, wherein the first end portion includes an inlet through which the measuring fluid is introduced into the sensor cavity.

6. The pressure sensor of claim 5, wherein the inlet is sealed with a sealer ball.

7. The pressure sensor of claim 5, wherein the inlet is sealed with a welded plug.

8. The pressure sensor of claim 3, wherein the second end portion is coupled to the bellows and wherein the second end portion and the separator wall define opposite ends of the bellows cavity.

9. The pressure sensor of claim 8, wherein the second end portion includes a fluid channel that allows a measured fluid to pass from outside of the pressure sensor into the inner volume of the bellows.

10. A method of measuring the pressure of a measured liquid located in a borehole penetrating the earth, the method comprising:
    forming a pressure sensor having: an outer body, the outer body including a resonator cavity, a bellows cavity, and a separator wall disposed within the sensor cavity and separating the resonator cavity from the bellows cavity, the separator wall including a throat that allows for the measuring fluid to pass between the resonator cavity and the bellows cavity; a bellows; and a measuring liquid between the outer body and the bellows, the bellows having an outer side and an inner side, the inner side defining an interior volume;
    locating the pressure sensor in the measured liquid such that the measured liquid enters the interior volume; and
    sensing the pressure of the measured liquid based on pressure exerted on the measuring liquid caused by movement of the bellows.

11. The method of claim 10, wherein forming includes:
    arranging the bellows at least partially within the sensor body such that the measured liquid cannot contact the outer side.

* * * * *